United States Patent
Fjeldheim et al.

(10) Patent No.: US 11,420,822 B2
(45) Date of Patent: Aug. 23, 2022

(54) CONTAINER HANDLING VEHICLE WITH DIRECT DRIVE ON LIFTING AXLE(S), ASSOCIATED METHODS AND SYSTEM

(71) Applicant: Autostore Technology AS, Nedre Vats (NO)

(72) Inventors: Ivar Fjeldheim, Haugesund (NO); Børge Bekken, Haugesund (NO); Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 11 days.

(21) Appl. No.: 16/771,407

(22) PCT Filed: Jan. 7, 2019

(86) PCT No.: PCT/EP2019/050228
§ 371 (c)(1),
(2) Date: Jun. 10, 2020

(87) PCT Pub. No.: WO2019/137870
PCT Pub. Date: Jul. 18, 2019

(65) Prior Publication Data
US 2020/0346864 A1    Nov. 5, 2020

(30) Foreign Application Priority Data
Jan. 9, 2018   (NO) .................................. 20180031

(51) Int. Cl.
*B65G 1/04*     (2006.01)
*B65G 1/06*     (2006.01)
*B65G 1/137*    (2006.01)

(52) U.S. Cl.
CPC ........... *B65G 1/0464* (2013.01); *B65G 1/065* (2013.01); *B65G 1/0492* (2013.01);
(Continued)

(58) Field of Classification Search
CPC .... B65G 1/0464; B65G 1/065; B65G 1/0492; B65G 1/1378; B65G 2201/0235; G05D 2201/0216
See application file for complete search history.

(56) References Cited

U.S. PATENT DOCUMENTS

| | | | |
|---|---|---|---|
| 1,953,132 A | 4/1934 | Renken | |
| 3,334,522 A | 8/1967 | Toffin | |
| (Continued) | | | |

FOREIGN PATENT DOCUMENTS

| | | |
|---|---|---|
| CN | 201186870 Y | 1/2009 |
| CN | 102407985 A | 4/2012 |
| (Continued) | | |

OTHER PUBLICATIONS

International Search Report issued in PCT/EP2019/050228 dated Apr. 15, 2019 (5 pages).
(Continued)

*Primary Examiner* — Saul Rodriguez
*Assistant Examiner* — Ashley K Romano
(74) *Attorney, Agent, or Firm* — Osha Bergman Watanabe & Burton LLP

(57) ABSTRACT

An automated storage and retrieval system comprises a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and a plurality of stacks of storage containers arranged in storage columns located beneath the rail system.

(Continued)

Each storage column is located vertically below a grid opening. A container handling vehicle comprises a transport mechanism for transport of the vehicle on the rail system, a lifting assembly for picking up storage containers from the storage columns to a position above the lowest level of the transport mechanism. The lifting assembly comprises a lifting frame connectable to a storage container, a first lifting shaft and a second lifting shaft, the first and second lifting shafts being mainly parallel, and each of the first and second lifting shafts being supported in an upper portion of the vehicle, two lifting elements extending from each of the first and second lifting shafts to the lifting frame, a motor drive assembly comprising at least a first motor, wherein the at least first motor encircles one of the lifting shafts, and a force transferring assembly rotatably connecting the first and second lifting shafts via a force transferring element.

17 Claims, 12 Drawing Sheets

(52) U.S. Cl.
CPC .... *B65G 1/1378* (2013.01); *B65G 2201/0235* (2013.01); *G05D 2201/0216* (2013.01)

(56) References Cited

U.S. PATENT DOCUMENTS

| | | | | |
|---|---|---|---|---|
| 10,507,754 | B2* | 12/2019 | Ellis | B60P 3/007 |
| 10,703,564 | B2* | 7/2020 | Hognaland | B65G 1/0478 |
| 10,829,302 | B2* | 11/2020 | Lindbo | B65G 57/03 |
| 11,273,980 | B2* | 3/2022 | Ingram-Tedd | B65G 1/0464 |
| 2004/0096303 | A1* | 5/2004 | Resta | B65G 47/514 |
| | | | | 414/331.13 |
| 2008/0277243 | A1* | 11/2008 | Hayduchok | B65G 1/065 |
| | | | | 198/463.6 |
| 2013/0248474 | A1* | 9/2013 | Tourdot | B65G 1/10 |
| | | | | 211/85.8 |
| 2014/0031972 | A1* | 1/2014 | DeWitt | B65G 1/137 |
| | | | | 700/214 |
| 2016/0340122 | A1 | 11/2016 | Lindblom | |
| 2017/0129702 | A1* | 5/2017 | Hognaland | B65G 1/0478 |
| 2018/0037410 | A1* | 2/2018 | DeWitt | B65G 1/0485 |
| 2018/0148259 | A1* | 5/2018 | Gravelle | B65G 1/0464 |
| 2019/0047787 | A1* | 2/2019 | Fosnight | B25J 15/0047 |
| 2019/0062058 | A1* | 2/2019 | Goetz | B65G 1/04 |
| 2020/0087067 | A1* | 3/2020 | Fosnight | B65G 1/0492 |
| 2021/0155408 | A1* | 5/2021 | Austrheim | B65G 1/0464 |
| 2021/0237976 | A1* | 8/2021 | Tsukamoto | B65G 1/0435 |

FOREIGN PATENT DOCUMENTS

| | | |
|---|---|---|
| CN | 106660703 A | 5/2017 |
| JP | H02-11455 A | 1/1990 |
| JP | H04-123969 A | 4/1992 |
| KR | 101011371 B1 | 1/2011 |
| NO | 317366 B1 | 10/2004 |
| WO | 2005/030618 A1 | 4/2005 |
| WO | 2014/075937 A1 | 5/2014 |
| WO | 2014/090684 A1 | 6/2014 |
| WO | 2015/115965 A1 | 8/2015 |
| WO | 2015/193278 A1 | 12/2015 |
| WO | 2016/198467 A1 | 12/2016 |
| WO | 2017/129384 A1 | 8/2017 |

OTHER PUBLICATIONS

Written Opinion of the International Searching Authority issued in PCT/EP2019/050228 dated Apr. 15, 2019 (9 pages).
Jin-Woo Ahn, (2011) "Switched Reluctance Motor, Torque Control" Prof. Moulay Tahar Lamchich (Ed.), ISBN:978-953-307-428-3, InTech, Available from: http://www.intechopen.com/books/torque-control/switched-reluctance-motor, pp. 201-252 (54 pages).
Wikipedia, "Brushless DC electric motor", https://en.wikipedia.org/wiki/Brushless_DC_electric_motor (10 pages).
Office Action issued in the counterpart Chinese Patent Application No. 201980006749.8, dated Mar. 17, 2021 (23 pages).

* cited by examiner

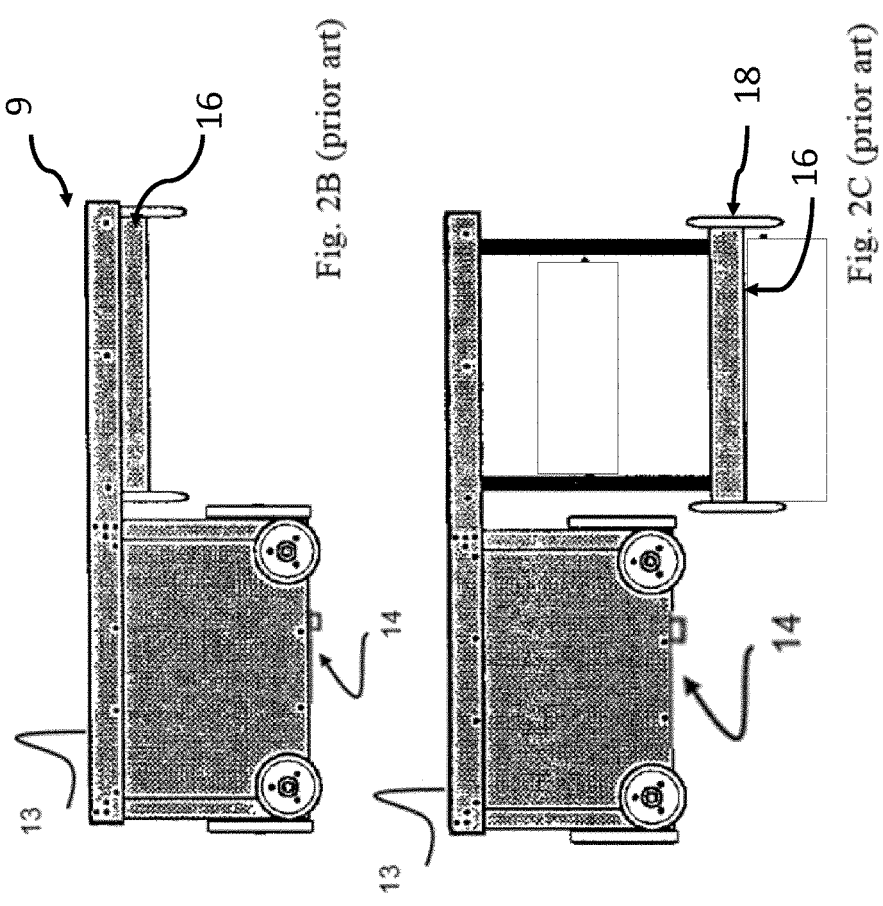

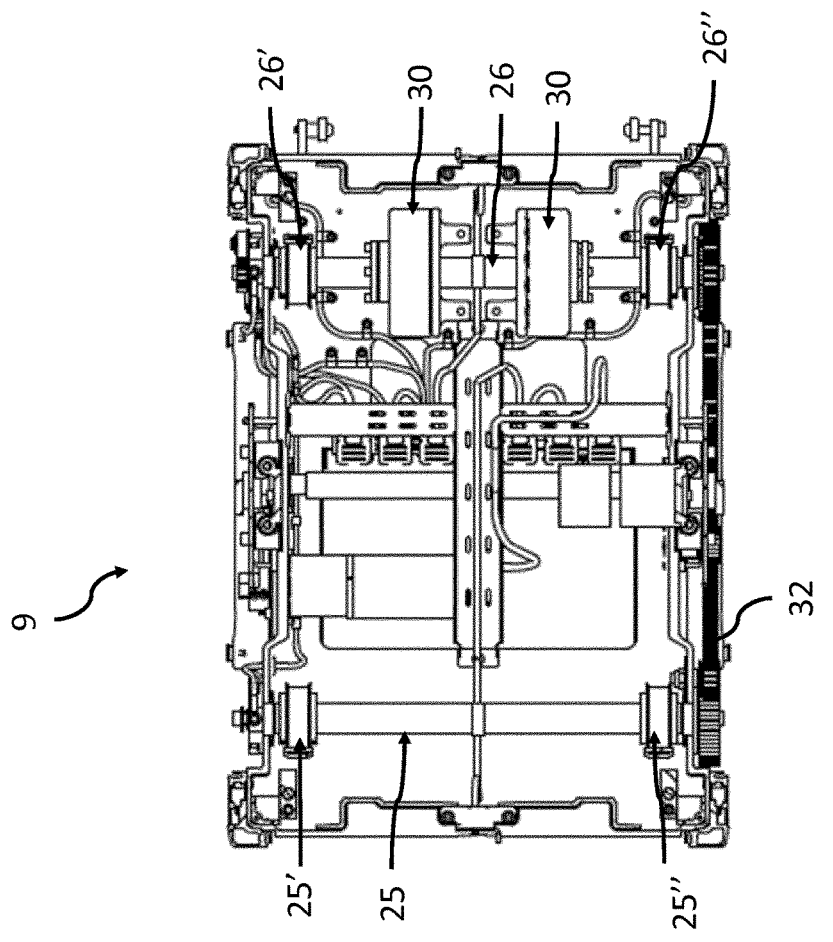
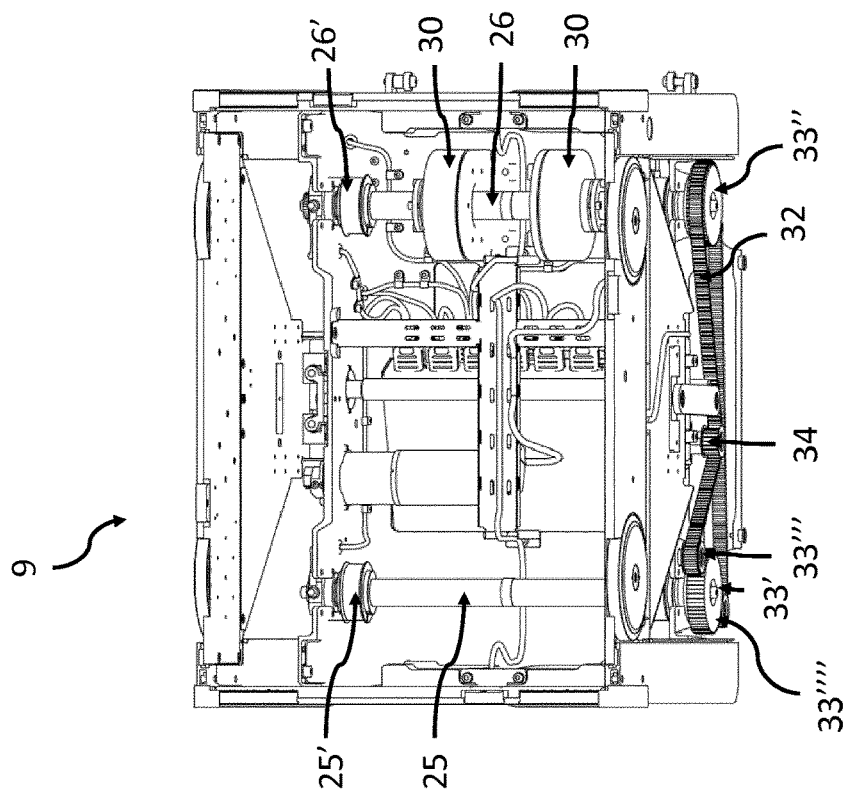

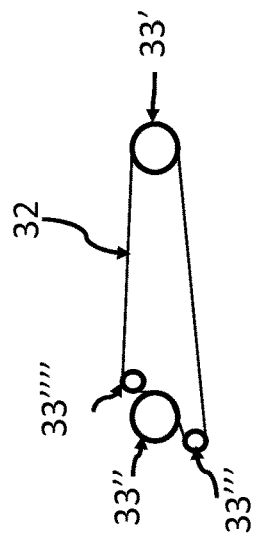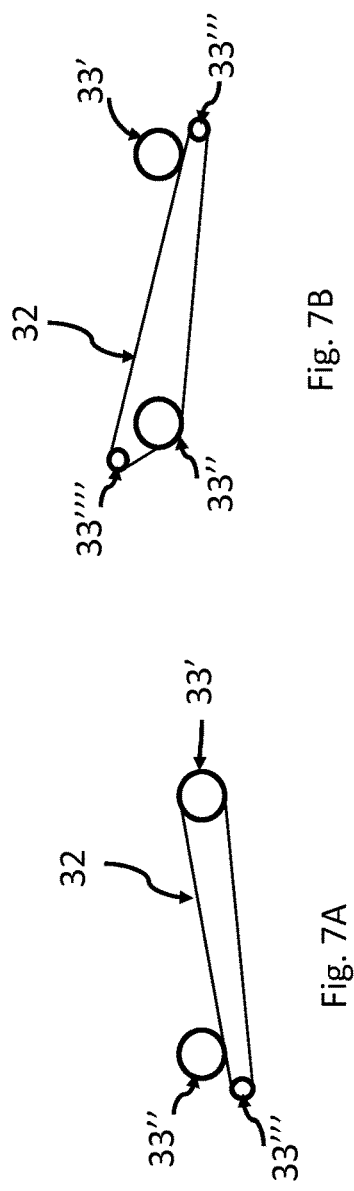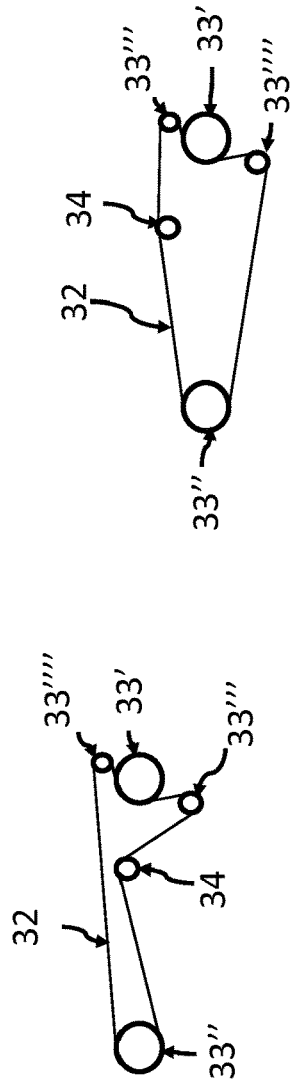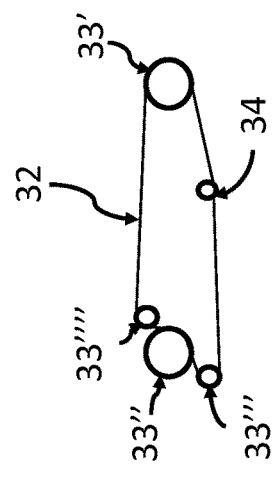

CONTAINER HANDLING VEHICLE WITH DIRECT DRIVE ON LIFTING AXLE(S), ASSOCIATED METHODS AND SYSTEM

The present invention relates to an automated storage and retrieval system, a container handling vehicle which can operate on an automated storage and retrieval system, and a method of operating an automated storage and retrieval system.

BACKGROUND AND PRIOR ART

FIG. 1 discloses a framework structure 1 of a typical prior art automated storage and retrieval system and FIGS. 2A-2C disclose different container handling vehicles 9 of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 store storage containers 6, also known as bins, are stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the stacks 7 of storage containers 6, and guides vertical movement of the containers 6, but does normally not otherwise support the storage containers 6 when stacked.

A rail system 8 is arranged in a grid pattern across the top of the storage columns 5, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X. In this way, the rail system 8 defines grid columns 12 above which the container handling vehicles 9 can move laterally above the storage columns 5, i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIG. 2A two wheels in each of the sets 14, 15 are visible, while in FIGS. 2B and 2C only two wheels in one of the set of wheels 14 are visible. The first set of wheels 14 is arranged to engage with two adjacent rails of the first set 10 of rails, and the second set of wheels 15 arranged to engage with two adjacent rails of the second set 11 of rails. Each set of wheels 14, 15 can be lifted and lowered, so that the first set of wheels 14 and/or the second set of wheels 15 can be engaged with the respective set of rails 10, 11 at any one time.

Each container handling vehicle 9 also comprises a lifting device 16 (see FIGS. 2B and 2C) for vertical transportation of storage containers 6, e.g. raising a storage container 6 from and lowering a storage container 6 into a storage column 5. The lifting device may be arranged inside the body 13 (as in FIG. 2A) or outside the body 13 (as disclosed in FIGS. 2B and 2C). The lifting device 16 may comprise a lifting frame 18 which is adapted to engage a storage container 6, which lifting frame 18 can be lowered from the vehicle body 13 so that the position of the lifting frame with respect to the vehicle body 13 can be adjusted in a third direction Z, which is orthogonal the first direction X and the second direction Y.

Conventionally, and also for the purpose of this application, Z=1 identifies the uppermost layer of the grid 4, i.e. the layer immediately below the rail system 8, Z=2 the second layer below the rail system 8, Z=3 the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column can be identified by its X and Y coordinates.

Each container handling vehicle 9 comprises a storage compartment or space for receiving and stowing a storage container 6 when transporting the storage container 6 across the grid 4. The storage space may comprise a cavity arranged centrally within the vehicle body 13 (FIG. 2A), e.g. as is described in WO2014/090684A1, the contents of which are incorporated herein by reference. Alternatively, the storage compartment or space can be arranged on the side of the body as disclosed in FIGS. 2B and 2C, i.e. the container handling vehicles may have a cantilever construction, as is described in NO317366, the contents of which are also incorporated herein by reference.

The container handling vehicles 9 may have a footprint 22 (see FIG. 4), i.e. an extent in the X and Y directions, which is generally equal to the lateral or horizontal extent of a grid column 12, i.e. the extent of a grid column 12 in the X and Y directions, e.g. as is described in WO2015/193278A1, the contents of which are incorporated herein by reference. Alternatively, the container handling vehicles 9 may have a footprint which is larger than a lateral extent of a grid column 12, e.g. as is disclosed in WO2014/090684A1.

The rail system 8 may be a single rail system, as is shown in FIG. 3. Alternatively, the rail system 8 may be a double rail system, as is shown in FIG. 4, thus allowing a container handling vehicle 9 having a footprint 22 generally corresponding to the lateral extent of a grid column 12 to travel along a row of grid columns even if another container handling vehicle 9 is positioned above a grid column neighbouring that row.

In a storage grid, a majority of the grid columns 12 are storage columns 5, i.e. grid columns where storage containers are stored in stacks. However, a grid normally has at least one grid column which is used not for storing storage containers, but which comprises a location where the container handling vehicles can drop off and/or pick up storage containers so that they can be transported to an access station where the storage containers can be accessed from outside of the grid or transferred out of or into the grid. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

The access station may typically be a picking or a stocking station where product items are removed from or positioned into the storage containers. In a picking or a stocking station, the storage containers are normally never removed from the automated storage and retrieval system, but are returned back into the grid once accessed. A port can also be used for transferring storage containers out of or into the grid, e.g. for transferring storage containers to another storage facility (e.g. to another grid or to another automated storage and retrieval system), to a transport vehicle (e.g. a train or a lorry), or to a production facility.

A conveyor system comprising conveyors is normally employed to transport the storage containers between the ports and the access station.

If the port and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

WO2016/198467A1, the contents of which are incorporated herein by reference, disclose an example of a prior art access system having conveyor belts (FIGS. 5a and 5b in WO2016/198467A1) and a frame mounted track (FIGS. 6a and 6b in WO2016/198467A1) for transporting storage containers between ports and work stations where operators can access the storage containers.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column in which the target storage container is positioned, retrieving the storage container from the storage column using the container handling vehicle's lifting device (not shown), and transporting the storage container to the drop-off port 19. If the target storage container 6 is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle 9 that is subsequently used for transporting the target storage container to the drop-off port 19, or with one or a plurality of other cooperating container handling vehicles 9. Alternatively, or in addition, the automated storage and retrieval system may have container handling vehicles 9 specifically dedicated to the task of temporarily removing storage containers 6 from a storage column. Once the target storage container has been removed from the storage column, the temporarily removed storage containers 6 can be repositioned into the original storage column. However, the removed storage containers 6 may alternatively be relocated to other storage columns.

When a storage container 6 is to be stored in the grid 4, one of the container handling vehicles 9 is instructed to pick up the storage container from the pick-up port 20 and transport it to a grid location above the storage column where it is to be stored. After any storage containers 6 positioned at or above the target position within the storage column stack have been removed, the container handling vehicle 9 positions the storage container 6 at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6, and the movement of the container handling vehicles 9 so that a desired storage container can be delivered to the desired location at the desired time without the container handling vehicles 9 colliding with each other, the automated storage and retrieval system comprises a control system, which typically is computerised and comprises a database for keeping track of the storage containers.

Furthermore, in the prior art lifting systems for container handling vehicles, the lifting assembly comprise a mechanical motor, mechanically connected to two separate lifting shafts via a gear and belt arrangement. The mechanical parts will, over time, be subject to wear and tear resulting in uneven/skewed lifting of the storage containers.

It is thus an objective of the invention to provide a lifting system for the container handling vehicle which provides for a more stable lift of the storage containers or storage bins.

More specifically, it is an objective of the present invention to provide a lifting system for container handling vehicle where the lifting operation provides for minimum relative movement of the different lifting bands connected to a lifting frame to ensure that the storage container or storage bin is kept leveled with a plane substantially parallel with a horizontal plane during the entire vertical lifting operation.

It is a further objective of the invention to be less dependent on mechanical parts in the lifting system as the mechanical parts are susceptible to wear and tear.

SUMMARY OF THE INVENTION

The invention is set forth in the independent claims and the dependent claims describe alternatives of the invention.

The invention relates to an automated storage and retrieval system comprising:
  a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks; and
  a plurality of stacks of storage containers arranged in storage columns located beneath the rail system, wherein each storage column is located vertically below a grid opening;
  a container handling vehicle comprising:
  a transport mechanism for transport of the vehicle on the rail system,
  a lifting assembly for picking up storage containers from the storage columns to a position above the lowest level of the transport mechanism,
  wherein the lifting assembly comprises:
  a lifting frame connectable to a storage container, a first lifting shaft and a second lifting shaft of equal or near equal diameter, the first and second lifting shafts being mainly parallel, and each of the first and second lifting shafts being supported in an upper portion of the vehicle, two lifting elements extending from each of the lifting shafts to the lifting frame, a motor drive assembly comprising at least one motor, wherein the at least one motor encircles one of the lifting shafts, and a force transferring assembly rotatably connecting the first and second lifting shafts via a force transferring element.

The first and second lifting shafts are preferably of equal or near equal diameter. This provides for a similar angular velocity of the reeling surfaces on the first and second lifting shafts when the lifting shafts are rotated, and results in that the lifting frame is substantially leveled during lifting and lowering (i.e. the lifting frame is parallel with horizontal planes during lifting and lowering).

The force transferring element of the force transferring assembly can be seen as a timing belt, which ensures that the first and second lifting shafts are synchronized. Alternatively, the force transferring element comprises a driving belt. Alternatively, the force transferring assembly may comprise a belt in the form of a chain. Thus, the force transferring element can be any synchronizing device that ensures that the angular velocities of the reeling surfaces of the first and second lifting shafts are matched, thereby the lifting frame is evenly lifted, i.e. the lifting frame is substantially parallel with a horizontal plane during lifting and lowering.

Common to all the aspects of the system is the presence of:

a first and second lifting shaft wheel whereof each is connected for rotation with the respective lifting shaft,
at least one other guide wheel,
a force transferring element forming a closed loop, and
at least one of the other guide wheels is arranged inside the closed loop,
the first or second lifting shaft wheel is in contact with an inner surface of the force transferring element, and
the other of said first or second shaft is in contact with an outer surface of the force transferring element. In other words, one of the first or second lifting shaft wheels is arranged inside the closed loop formed by the force transferring element and the other of the first or second lifting shaft wheel is arranged outside the closed loop formed by the force transferring element. Such setup results in opposite rotation of the first lifting shaft relative the second lifting shaft.

One electric motor may be arranged around one of the lifting shafts providing power transfer, i.e. a rotational movement, to the lifting shaft. In one aspect, the lifting shaft may form an integral part of the electric motor.

In an aspect, the force transferring element comprises an endless belt with an inner surface and an outer surface and wherein the first lifting shaft is in contact with the inner surface or the outer surface of the belt and the second lifting shaft is in contact with the other of said inner surface or outer surface of the belt. Alternatively, the force transferring element can comprise a Mobius strip. In all aspects, the force transferring assembly is configured such that the first and second lifting shafts rotate in opposite directions.

Thus, the force transferring assembly is arranged in a configuration rendering possible the opposite rotation, i.e. counter rotation, of the first lifting shaft relative the second lifting shaft.

The force transferring assembly may comprise a first lifting shaft wheel connected for rotation with the first lifting shaft and a second lifting shaft wheel connected for rotation with the second lifting shaft and at least one guide wheel urging the outer surface of the belt against one of the first or second lifting shaft wheels, such that when one of the first or second lifting shaft moves in a first rotational direction the other of said first and second lifting shaft moves in a second rotational direction opposite the first direction, in both rotational directions. This opposite rotation ensures that the lifting frame, and any storage container lifted by the lifting frame, is lifted substantially vertically with minimum horizontal movement during the vertical lifting operation. Preferably, the first and second lifting shafts and the lifting elements, are such connected that the lifting elements are reeled onto the lifting shafts from outside. This ensures connection of the lifting elements in end portions (e.g. in the corners or close to the corners) of the lifting frame as well as it ensures that the lifting frame is centred and only moves in the vertical direction (no horizontal movement) relative the first and second lifting shafts during the entire lifting sequence.

The force transferring element may in one aspect form a closed loop where one of the first or second lifting shaft wheels is arranged inside the closed loop and the other of the first or second lifting shaft wheels is arranged outside the closed loop. Such setup facilitates the arrangement of vertical keyhole shaped holes for mounting the shafts while allowing ease of maintenance too.

In an aspect, the force transferring assembly comprises a tensioning or tightening mechanism for initial tightening of the force transferring element. The tensioning mechanism may comprise an eccentric tensioning mechanism comprising a tightening wheel with an axle that can be adjusted within an opening in a fixed bracket. Thus, the axle of the tightening wheel can be moved in different directions relative the opening in the fixed bracket. The area of the opening is thus larger than an area occupied by the cross section of the axle within the opening in all positions of the axle within the opening. Such tensioning mechanism can be advantageous in order to further ensure that the force transferring assembly can provide synchronous operation of the first and second lifting shafts. The force transferring element is preferably of a non-elastic material such that the length of the force transferring element is fixed. When the force transferring element is initially installed, proper tensioning is assured using a tuning fork measuring the frequency of the force transferring element. The frequency corresponds to a given tension. The tensioning in the force transferring element is adjusted by moving the tightening wheel within the opening of the bracket, thereby the length of the force transferring element is adjusted and thus the tension in the force transferring element. When the frequency of the force transferring element is within a predetermined frequency range, the tightening wheel is locked in this position by appropriate fastening elements such as screws or bolts etc. Once locked in dedicated position, the force transferring assembly (i.e. the force transferring element and the guide wheel(s) and/or tightening wheel) is, in theory, adapted to operate for several thousands of hours before it has to be changed, similar to a drive belt in a combustion engine in a car.

The tightening wheel of the tensioning mechanism may be a separate guide wheel from the guide wheels used in the counter rotation mechanism of the first and second lifting shafts, or may be one of the guide wheels used for the counter rotation of the first and second lifting shafts.

In an aspect, the at least one motor comprises a brushless DC motor. Various types of brushless DC motors are known, including permanent magnet synchronous motor (using permanent magnets) and switched reluctance motors (does not use any permanent magnets).

The working principles of the permanent magnet synchronous brushless DC motor is known to the skilled person, e.g. as described in https://en.wikipedia.org/wiki/Brushless_DC_electric_motor, and typically uses one or more permanent magnets in the rotor and electromagnets on the motor housing for the stator. A motor controller converts DC to AC. This design is mechanically simpler than that of brushed motors because it eliminates the complication of transferring power from outside the motor to the spinning rotor. The motor controller can sense the rotor's position via Hall effect sensors or similar devices and can precisely control the timing, phase, etc., of the current in the rotor coils to optimize torque, conserve power, regulate speed, and even apply some braking.

The working principles of switched reluctance motors are known to the skilled person and are described in for instance Jin-Woo Ahn (2011), Switched Reluctance Motor, Torque Control, Prof. Moulay Tahar Lamchich (Ed.), ISBN: 978-953-307-428-3, InTech, available from: http://cdn.intechweb.org/pdfs/13717.pdf and in R. Krishnan (2001), Switched reluctance motor drives: Modelling, Simulation, Analysis, Design and Applications; CRC Press.

In an aspect, the at least one motor comprises a rotary electrical motor converting direct current electrical energy into rotational energy of the at least first or second lifting shafts.

In an aspect, the at least one motor is a permanent magnet brushless DC motor, where the motor comprises a stator arranged radially between rotor magnets (on the radial outside of the stator) and the first or second lifting shaft (on the radial inside of the stator). The stator may be fixed to a stator housing, which stator housing is connected to a housing of the container handling vehicle. The rotor magnets may be arranged on an inside of a wheel rim surrounding the stators and can be connected to rotate with the first or second lifting shaft such that the rotor magnets and the first or second lifting shafts rotates together. The stator(s) then rotates the rotor magnets and thereby the lifting shaft. The stator may, e.g. be arranged at least partly, preferably fully, within the same rotational plane as a motor housing and at least partly, preferably fully, within the container vehicle body. The term "rotational plane" signifies in this embodiment the plane extending perpendicular from the rotational axis of the lifting shafts. Said stators include both windings and yoke, and the stator field windings are following the outer periphery of wheel rim where the rotor magnets are arranged.

In an aspect, the electric motor may be a reluctance motor with similar working principles as the permanent magnet brushless DC motor described above, for instance a switched reluctance motor, comprising a stator element with multiple stator poles and a rotor element featuring multiple rotor poles, connected to, or being part of, a drive shaft where one of the lifting shafts is the rotor element, or forms part of the rotor element. The rotor element (or drive shaft) of the reluctance motor may be aligned with the centerline of the lifting shaft or comprise a part of one end of the lifting shaft. Alternatively, the stator element can be arranged within the rotor element (or vice versa), and the rotor element may be arranged within the lifting shaft, as a part of, or operationally connected to, said lifting shaft. This latter solution will free a maximum amount of space within the cavity of the vehicle body.

In an aspect, the container handling vehicle comprises means suitable for measuring (at least indirectly) electromotive force (emf) of at least one of the lifting shafts, the means being in signal communication with one of the stator and the rotor, thereby allowing online rolling set specific velocity registration of the lifting operation during lifting. For example, a back-emf measurement circuit may be installed in signal communication with at least one of the lifting shafts. A hall sensor may be used as an alternative or in combination.

In another aspect, the container handling vehicle further comprises means suitable for measuring acceleration of at least one of the first and second lifting shafts, the means being in signal communication with the stator. Such a means comprises preferably one or more piezoelectric sensors, for example an accelerometer from PCB™ Piezotronics. One or more inductive sensors may be used as an alternative to piezoelectric sensor(s), or in combination with piezoelectric sensor(s).

In an aspect, the motor drive assembly comprises a second motor wherein the second motor encircles the same lifting shaft as the first motor, and wherein the force transferring assembly comprises a belt transferring torque from the first or second lifting shaft with the first and second motors to the other of the first or second lifting shaft.

In an aspect, the motor drive assembly comprises a second motor encircling the other of said first or second lifting shaft different from the first motor, and wherein the force transferring assembly comprises a timing belt providing synchronous movement of the first and second lifting shafts relative each other.

In an aspect, for example if using a first and second motor encircling the same lifting shaft or encircling respective first and second lifting shafts, the system further comprises sensing means, such as a sensor, in each of the first and second motors providing input to an encoder in each motor to determine the speed of each motor. Signals representing the speed of each motor are transmitted to a common control system, which control system, based on the signals, operate the different motors to increase or reduce their speed. This may for example be advantageous as an additional force transferring element in situations where the load of a storage container is unequally distributed and the center of gravity of the storage container is more to one side than another side (i.e. center of gravity is not in the geometric center of the bottom of the storage container) resulting in that the loads experienced by the motors are unequal. The sensor may for example read an optical disc provided with a number of data sources.

In an aspect, the force transferring arrangement is configured to synchronize the rotation of the first lifting shaft and the second lifting shaft.

In an aspect, a rotational force of the motor drive assembly corresponds to intended maximum weight of storage container with item. Such maximum weight may typically be from 2 to 50 kilograms.

In an aspect, the force transferring assembly comprises a number angular gears and a link shaft, wherein the angular gears are connected for rotation with each of the first and second lifting shafts and the link shaft is arranged between the angular gears of the first and second lifting gears.

The invention further relates to a container handling vehicle for moving storage containers stacked in stacks within an automated storage and retrieval system, wherein the container handling vehicle is configured to move on a rail system above storage columns and comprises:

a lifting assembly for picking up storage containers from the storage columns to a position above the lowest level of the transport mechanism on the container handling vehicle, wherein the lifting assembly comprises:

a lifting frame connectable to a storage container, a first lifting shaft and a second lifting shaft of equal or near equal diameter, the first and second lifting shafts being mainly parallel, each of the first and second lifting shafts being supported in an upper portion of the vehicle, two lifting elements extending from each of the first and second lifting shafts to the lifting frame, a motor drive assembly comprising at least a first motor, wherein the at least first motor encircles one of the lifting shafts, and a force transferring assembly rotatably connecting the first and second lifting shafts via a force transferring element. The automated storage and retrieval system may comprise a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks, and a plurality of stacks of storage containers arranged in storage columns located beneath the rail system, wherein each storage column is located vertically below a grid opening.

In an aspect of the container handling vehicle, the force transferring assembly comprises an endless belt and a first lifting shaft wheel connected for rotation with the first lifting shaft and a second lifting shaft wheel connected for rotation with the second lifting shaft and at least one guide wheel arranged such that when one of the first or second lifting shaft moves in a first rotational direction the other of said first and second lifting shaft moves in a second rotational direction opposite the first direction. The endless belt forms a closed loop and one of the first or second lifting shaft wheels is arranged inside the closed loop and the other of the first or second lifting shaft wheels is arranged outside the closed loop.

The container handling vehicle can have a central cavity or a cantilever construction for receiving storage containers.

It is further described use of a container handling vehicle as defined above for storage and retrieval of storage containers in a storage system.

It is further described a method of operating an automated storage and retrieval system as defined above, comprising providing signals to different container handling vehicles operating in said system to store storage containers in stacks and retrieve storage containers from stacks.

The invention further relates to use of a container handling vehicle as described above for storage and retrieval of storage containers in a storage system.

The invention further relates to a method of operating an automated storage and retrieval system as described above, comprising providing signals to different container handling vehicles operating in said system to store storage containers in stacks and retrieve storage containers from stacks.

The invention further relates to a method of operating a lifting assembly of a container handling vehicle comprising:

arranging a motor drive assembly comprising at least a first motor to encircle a first or a second lifting shaft of the lifting system, connecting two lifting elements from each of the first and second lifting shafts to a lifting frame, rotationally coupling the first and second lifting shafts to synchronize the raising and lowering of opposite sides of the lifting frame, using a lifting assembly for picking up storage containers from storage columns to a position above the lowest level of the transport mechanism on the container handling vehicle.

In an aspect of the method, the method further comprising:

encircling a second motor around the same first or second lifting shaft as the first motor, or around the other of said first or second lifting shaft as the first motor.

The lifting elements are preferable electrically and signally conductive such that grippers on the lifting frame can be electronically operated to grip and hold storage containers. The lifting elements may be bands or other electrically and signally conductive means.

The lifting shaft(s) is preferably provided with a brake arrangement. The brake arrangement can be arranged on an inside or outside of the container vehicle housing and can be a locking pin cooperating with a gear connected for rotation with the first or second lifting shaft, e.g. a ratchet mechanism. In a locked position of the locking arrangement, the locking pin is in engagement with the gear on the lifting shaft, thereby preventing rotation of the gear (and thus the lifting shaft). In an open position of the locking arrangement, the locking pin is operated to a position out of engagement with the gear on the lifting shaft, thereby the lifting shaft is free to rotate on any instructions from the motor(s).

Another advantage of the invention in view of the prior art solutions where the drive system for the lifting device is based on motors connected to the lifting shafts via gears is, in addition to a more reliable system with longer service intervals on the parts, a system which is easier to assemble as the system comprises fewer parts and is less complex. Furthermore, as the motor operates directly on the at least first and or second lifting shaft, a more efficient and accurate lifting is achieved as the lifting shaft(s) is instantaneously influenced by the motor(s).

In an aspect, the housing of the container handling vehicle is casted in one piece. The housing can e.g. be an Aluminum casing casted in one piece. Normally, according to prior art solutions, a plurality of thin metal plates are connected by screws or bolts. The one piece casting eliminates the need for the thin metal plates and thus reduces the number of screws used for connecting the plates (typically approximately 40 screws are used for connecting the plates). In addition, the one piece casting results in less time spent on assembling the container handling vehicles because there are less parts to assemble.

In an aspect, there may be four lifting elements in total, two from each of the first and second lifting shafts.

In the following description, numerous specific details are introduced by way of example only to provide a thorough understanding of embodiments of the claimed system, container handling vehicle and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention;

FIG. 2A is a perspective view of a first prior art container handling vehicle;

FIG. 2B is a perspective view of a second prior art container handling vehicle;

FIG. 2C is a side view of the second prior art container handling vehicle in FIG. 2B, showing a lifting device, i.e. elevator, for lifting and or lowering storage containers;

FIG. 6E is a perspective view of the first container handling vehicle from above, with two motors on the same lifting shaft;

FIG. 6F is a top view of the first container handling vehicle with two motors on the same lifting shaft;

FIGS. 7A-7F are examples of different setups of force transferring assemblies comprising guide wheel(s), lifting shaft wheels and force transferring element providing opposite rotation of the first and second lifting shafts;

In the drawings, like reference numerals have been used to indicate like parts, elements or features unless otherwise explicitly stated or implicitly understood from the context.

DETAILED DESCRIPTION OF THE INVENTION

Figure 1:
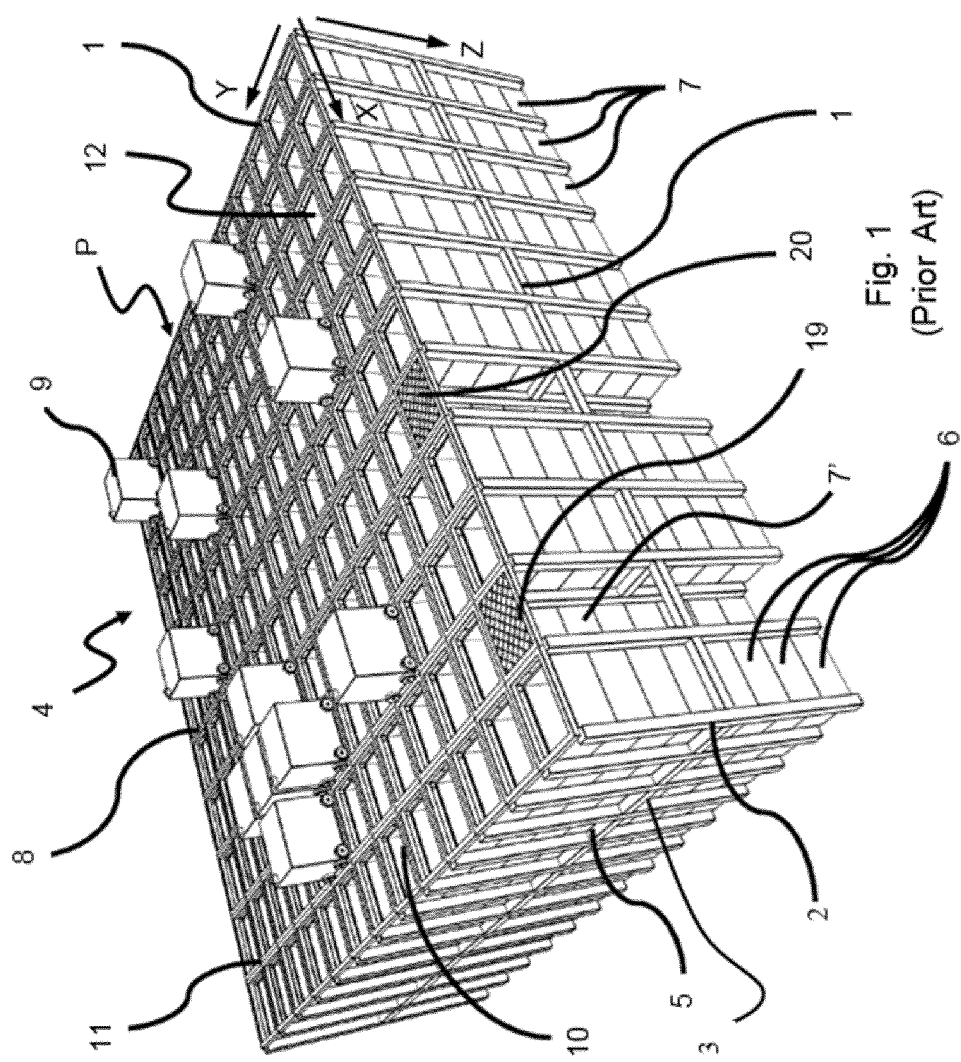
FIG. 1 is a perspective view of a grid with a rail system of a prior art automated storage and retrieval system.

In the following, embodiments of the invention will be discussed in more detail by way of example only and with reference to the appended drawings. It should be understood, however, that the drawings are not intended to limit the invention to the subject-matter depicted in the drawings. Furthermore, even if some of the features are described in relation to the system only, it is apparent that they are valid for the methods and the container handling vehicle as well, and vice versa, i.e. any features described in relation to the methods only are also valid for the system and container handling vehicle.

Figure 4:
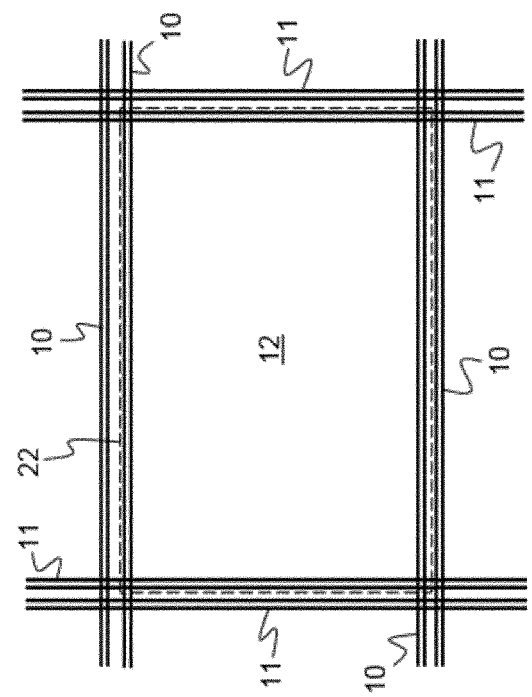
FIG. 4 is a top view of a prior art double rail grid.
Figure 3:
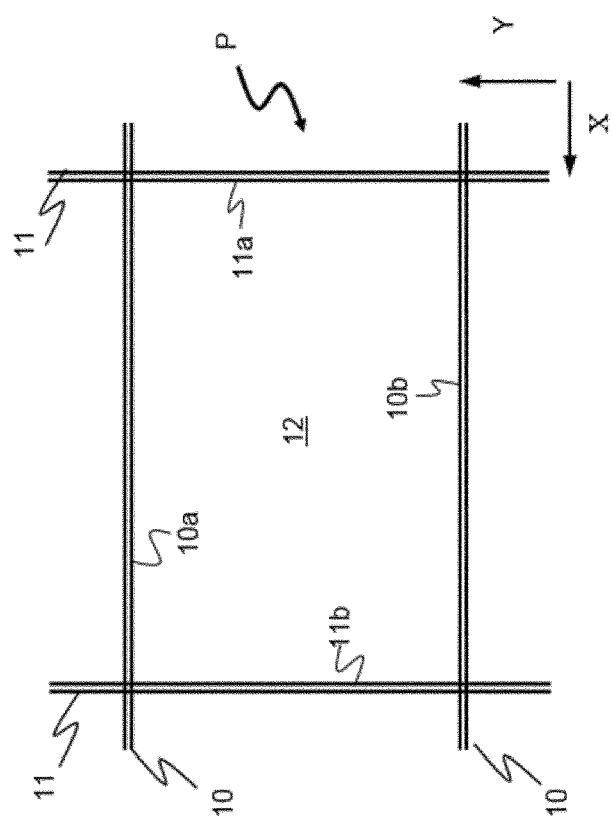
FIG. 3 is a top view of a prior art single rail grid.

FIG. 3 is a top view of a grid 4 with a rail system 8 of the automated storage and retrieval system. The grid 4 comprises a framework structure 1 comprising a plurality of upright members 2 (see FIG. 1) and a plurality of horizontal members 3 which are supported by the upright members. As is known in the art, the upright and horizontal members may typically be made of metal, e.g. extruded aluminium profiles. The upper surface of the grid 4 has a rail system 8. The rail system 8 comprises a first set of parallel tracks 10 arranged in a horizontal plane P and extending in a first direction X, and a second set of parallel tracks 11 arranged in the horizontal plane P and extending in a second direction Y which is orthogonal to the first direction X. The first and second sets of tracks 10, 11 form a grid pattern in the horizontal plane P comprising a plurality of adjacent grid cells, each comprising a grid opening 12 defined by a pair of neighboring tracks 10a, 10b of the first set of tracks 10 and a pair of neighboring tracks 11a, 11b of the second set of tracks 11. The example grid openings 12 in FIGS. 3 and 4 are part of the overall rail system 8 (see FIG. 1).

Figure 5A:
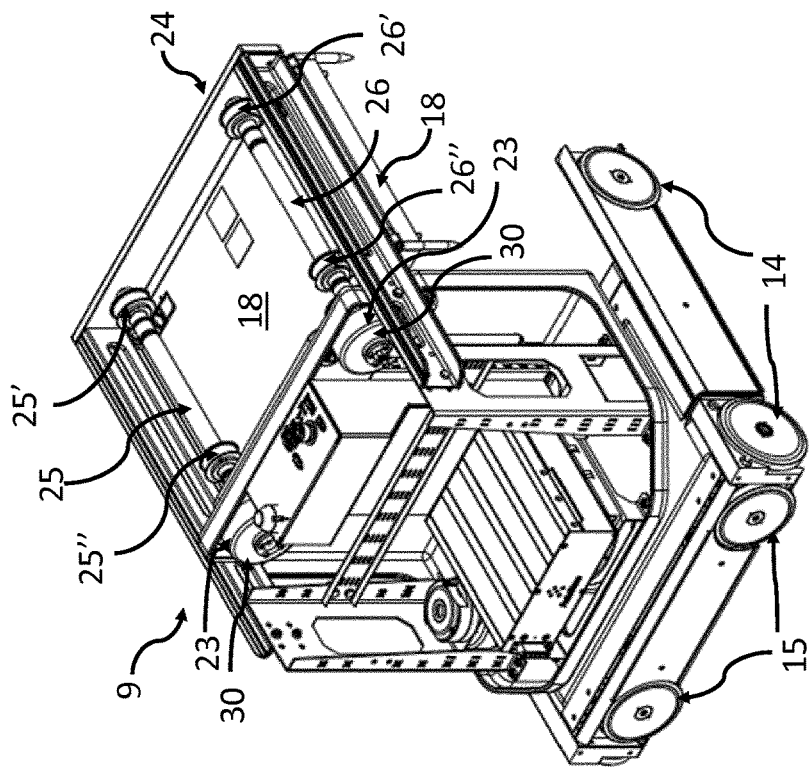
FIGS. 5A and 5B are perspective views of a second container handling vehicle with an exemplary lifting assembly according to the invention, with one motor on each of a first and second lifting shaft, seen from two different angles.
Figure 5B:
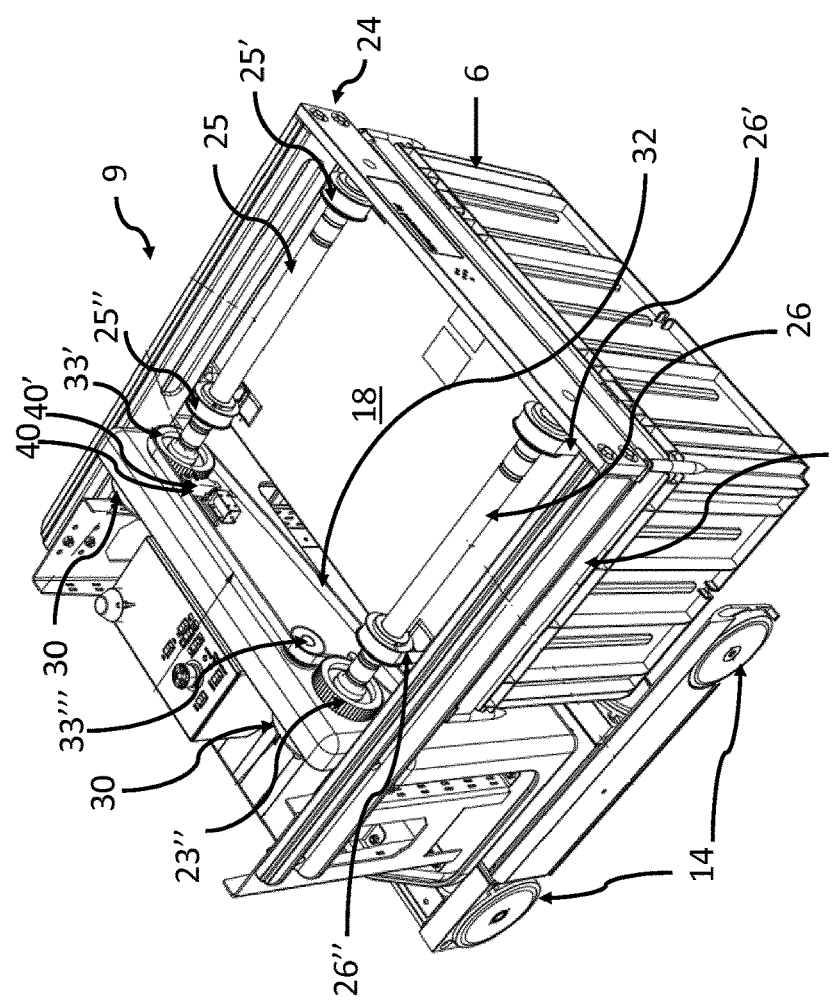
Figure 6B:
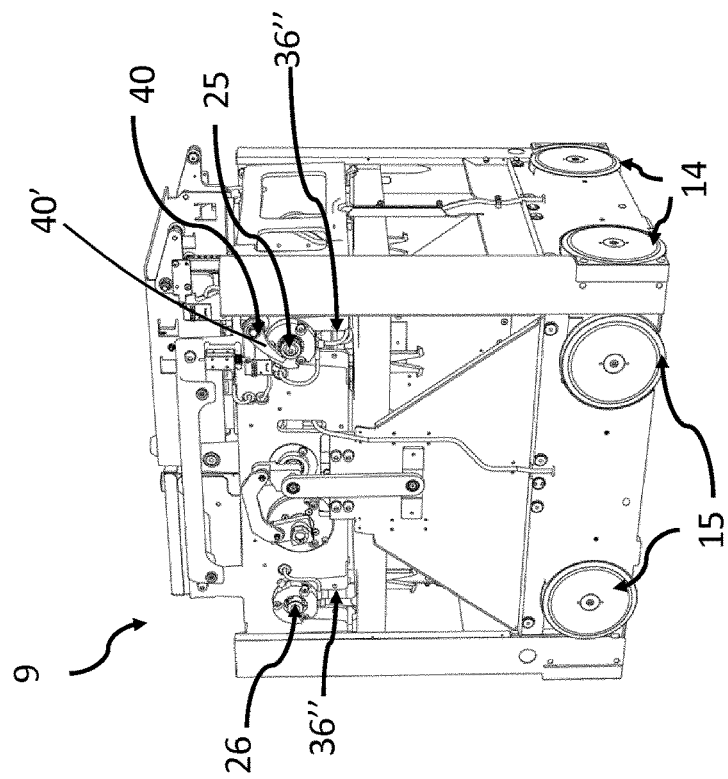
FIGS. 6A and 6B are perspective views from the sides of the first container handling vehicle with an exemplary lifting assembly according to the invention.
Figure 6A:
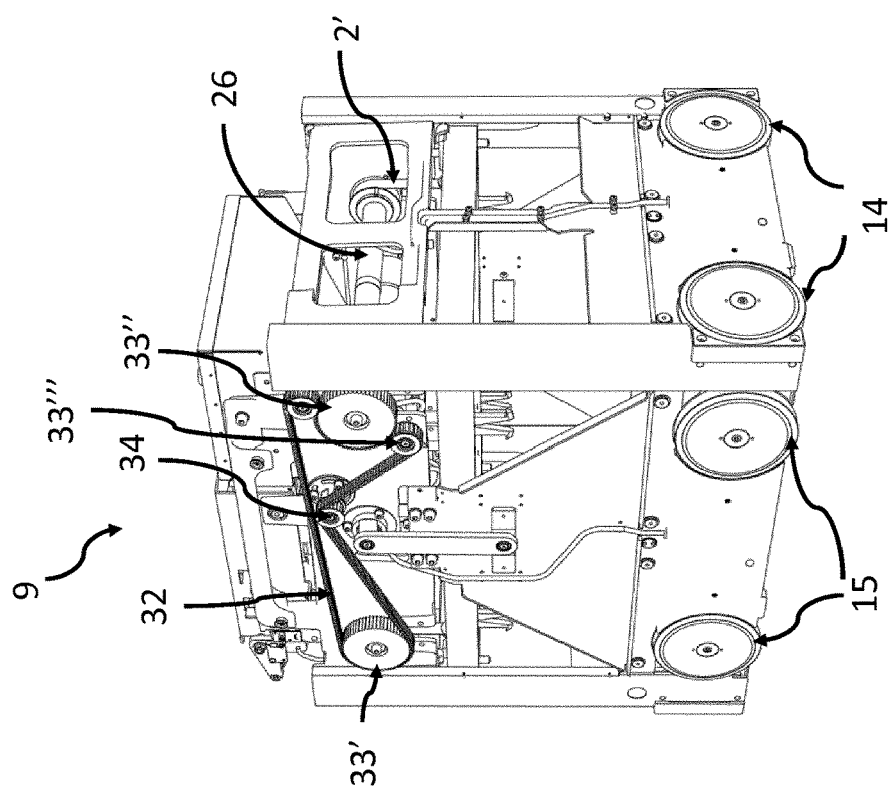

FIGS. 6A and 6B are perspective views from the sides of a first container handling vehicle with a lifting assembly according to the invention, and FIGS. 5A and 5B are perspective views of a second container handling vehicle with an exemplary lifting assembly according to the invention, with one motor on each of a first and second lifting shaft, seen from two different angles.

Starting with the second container handling vehicle 9 of FIGS. 5A and 5B, the container handling vehicle 9 comprises a transport mechanism exemplified as a first set of wheels 14 and a second set of wheels 15. The first set of wheels 14 and the second set of wheels are oriented in perpendicular directions such that the container handling vehicle 9 is configured to move on the rail system 8 above the storage columns 5, both in the X-direction and in the Y-direction. In an upper part of the container handling vehicle 9, there is arranged a lifting assembly 24 for picking up storage containers or bins 6 from the storage columns 5 to a position above the lowest level of the first and second sets of wheels 14, 15 on the container handling vehicle. The details of the operation of the container handling vehicle 9 and its setup is not described in greater detail herein as such container handling vehicles 9 are known. The lifting assembly 24 comprises a lifting frame 18 connectable to the storage container 6. The lifting frame 18 typically comprises a number of electrically operated grippers 38 (details of gripper in FIGS. 5C and 5E) arranged at the circumference of the lifting frame 18, which grippers 38 grip the storage containers 6 in order to lift and move the storage containers 6 between stacks 5, to port, to another storage system etc. A number of guiding devices 39 to guide the lifting frame 18 relative the storage containers 6 are arranged in the corners of the lifting frame 18, on the lower surface. The lifting frame 18 is lowered into the stacks and thus has a smaller cross-sectional area than the cells in the rail system 8.

Figure 5D:
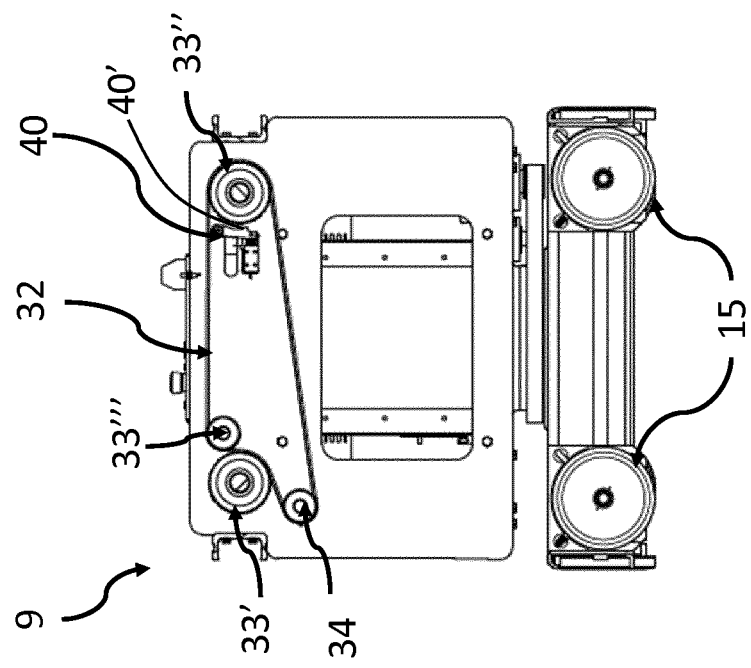
FIGS. 5C and 5D are side views of the second container handling vehicle with an exemplary lifting assembly according to the invention, seen from two different sides.
Figure 5C:
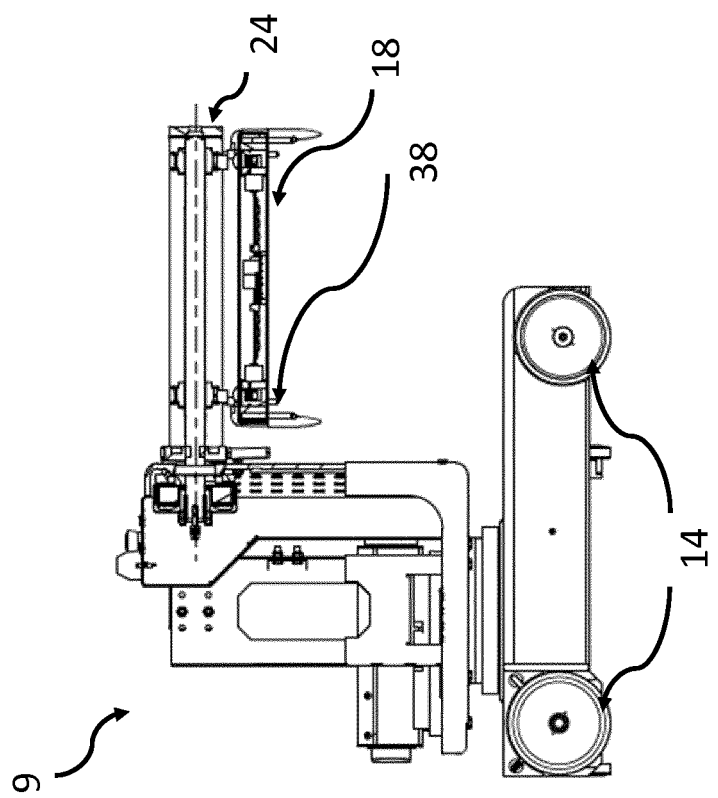

The lifting assembly 24 further comprises a first lifting shaft 25 and a second lifting shaft 26 of equal or near equal diameter. The first and second lifting shafts 25, 26 are arranged at opposite sides of the lifting assembly and are mainly parallel. Each of the first and second lifting shafts 25, 26 are supported in an upper portion of the vehicle 9. Two lifting elements, for example belts, 25', 25", 26', 26" extend from each of the first and second lifting shafts 25, 26 to the lifting frame 18 and is connected to the lifting frame 18 at flexible element connections 37 for the lifting elements (detail FIG. 5E). A motor drive assembly is connected to at least one of the first or second lifting shafts 25, 26. In FIGS. 54A and 5B the motor drive assembly comprises at two motors 30 encircling the respective first and second lifting shafts 25, 26. A force transferring assembly 32, 33', 33", 33''', 33'''', 35 rotatably connects the first and second lifting shafts 25, 26 via a force transferring element 32. A tensioning mechanism, shown as a tightening wheel 34, may be provided for initial tensioning of the force transferring element 32 in order to ensure proper force transfer and or synchronization between the first and second lifting shafts 25, 26. FIGS. 5C and 5D are side views of the second container handling vehicle 9 with an exemplary lifting assembly according to the invention, seen from two different sides.

Figure 5E:
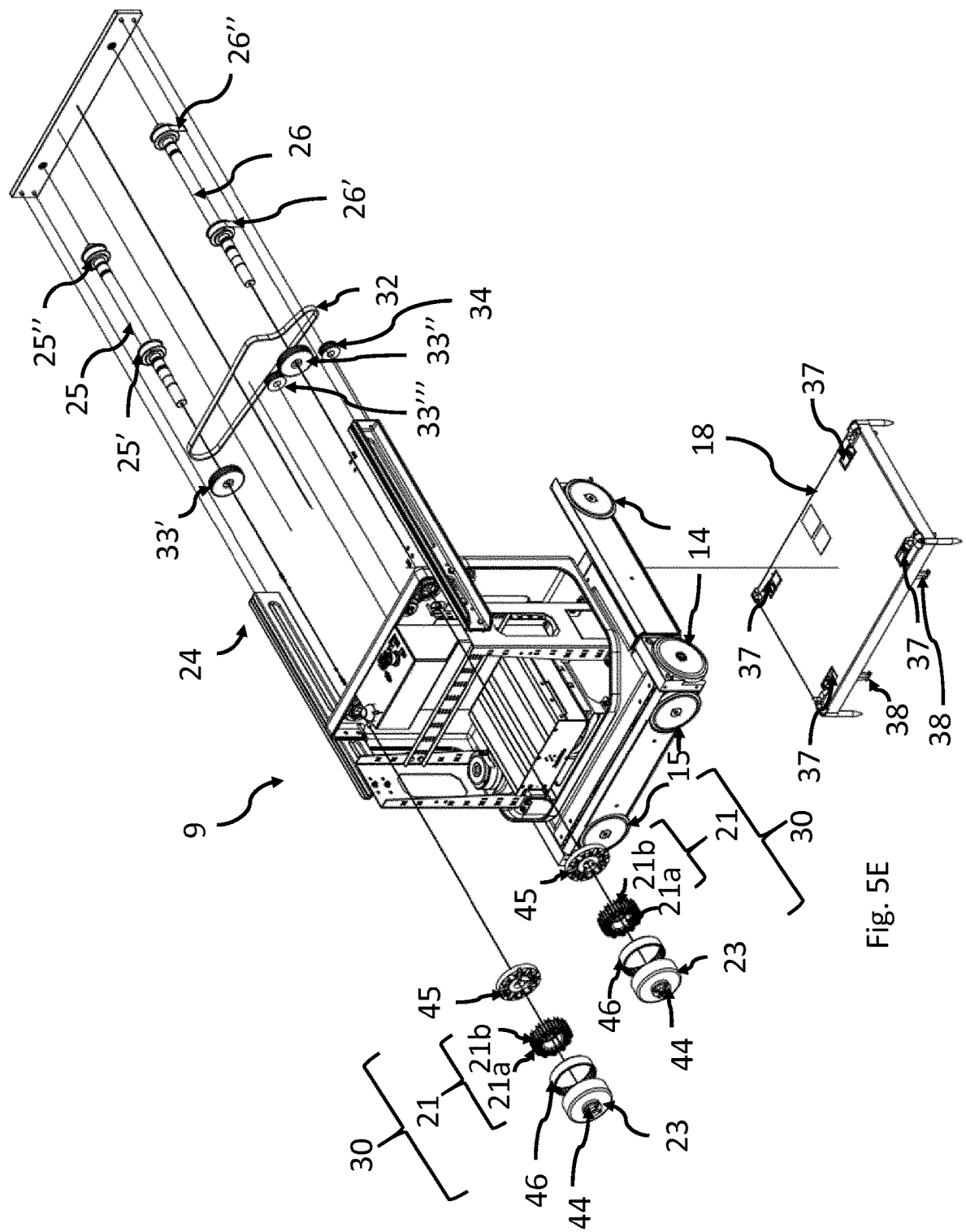
FIG. 5E is a perspective view of the second container handling vehicle with an exploded view of an exemplary lifting assembly according to the invention and with one motor on each of a first and second lifting shaft.

FIG. 5E is a perspective view of the second container handling vehicle with an exploded view of an exemplary lifting assembly according to one aspect of the invention and with one motor 30 on each of a first and second lifting shafts 25, 26. The motor 30 is exemplified as a brushless DC motor of the reluctance motor type, however other types of DC motors as exemplified and described in the general part of the description can be used instead of or in addition to the disclosed reluctance motor type, such as e.g. one or more permanent magnet motors or combinations of different brushless DC motors. The stator 21 in the motor 30 seen in FIG. 5E is in the form of electrical windings 21*a* wrapped around yokes 21*b*. However, a skilled person will understand that the stator 21 and rotor 22 may (in other embodiments of the invention) be configured with stator magnets and rotor yokes/windings, respectively. The motor 30 comprises the stator 21 arranged radially between rotor magnets (on the radial outside of the stator 21 inside wheel rim 46) and the first or second lifting shaft 25, 26 (on the radial inside of the stator 21). The stator 21 is fixed to a stator housing 45, which stator housing 45 is fixedly connected to the housing of the container handling vehicle 9. The rotor magnets (not shown) are arranged on an inside of a wheel rim 46 surrounding the stators 21 and is rotationally connected, for example via a cone bearing 44 (details of cone bearing 44 in FIG. 6G), to the first or second lifting shaft 25, 26 such that the rotor magnets and the first or second lifting shafts 25, 26 rotate together. The stator(s) 21 then rotates the rotor magnets and thereby the lifting shaft 25, 26. A protective cover 23 encircles the wheel rim 46 and stator 21.

FIG. 5E further discloses an example of how the lifting elements 25', 26, 26', 26" are reeled on a reel around the first and second lifting shafts 25, 26, respectively. When the lifting shafts 25, 26 rotate, the reels rotate together with the lifting shaft 25, 26 and, dependent on the direction of rotation, the lifting frame 18 is lifted or lowered. The lifting elements 25', 25", 26', 26" are preferably electrically and signally conductive such that grippers 38 in the lifting frame 18 can be electronically operated to grip and release bins or containers 6.

The force transferring assembly comprises a number of wheels 33', 33", 33''', 33'''', including first lifting shaft wheel 33' and second lifting shaft wheel 33", the wheels 33', 33", 33''', 33'''' being such mutually arranged that when one of the first or second lifting shafts 25, 26 move in a first rotational direction the other of said first and second lifting shafts 25, 26 moves in a second rotational direction opposite the first direction, in both rotational directions. The first lifting shaft wheel 33' is connected for rotation with the first lifting shaft 25 and the second lifting shaft wheel 33" is connected for rotation with the second lifting shaft 26, and follows any rotational movement of the first and second lifting shafts 25, 26, respectively. At least one of the other guide wheels 33''' is arranged inside the closed loop (see details in FIGS. 7A-7F). In addition, the first or second lifting shaft wheel 33', 33" is in contact with an inner surface of the endless belt 32 and the other of the first or second lifting shaft wheel 33', 33" is in contact with the outer surface of the endless belt 32, thereby the first and second lifting shaft wheels 33', 33" (and thus the first and second lifting shafts 25, 26) rotates in opposite direction. This opposite rotation ensures that the lifting frame 18, and any storage container lifted by the lifting frame 18, is lifted substantially vertically with minimum horizontal movement during the vertical lifting operation. Preferably, the first and second lifting shafts 25, 26 and the lifting elements 25', 25", 26', 26" are such connected that the lifting elements 25', 25", 26', 26" are reeled onto the first and second lifting shafts 25, 26 from outside (see details of lifting elements 26', 26" in FIG. 5A where it is disclosed that the lifting elements 26', 26" extends on the outside of the second lifting shaft 26). This ensures connection of the lifting elements 25', 25", 26', 26" in end portions (e.g. in the corners or close to the corners) of the lifting frame 18 as well as it ensures that the lifting frame is centred and only moves in the vertical direction (no or minimum horizontal movement) relative the first and second lifting shafts 25, 26 during the entire lifting sequence.

Again, with reference to FIGS. 5A and 5D, it is further disclosed a brake arrangement 40 for the lifting shaft(s). The brake arrangement is arranged inside the container handling vehicle 9 (could also be arranged on the outside of the container handling vehicle 9) and is disclosed as locking pin 40' cooperating with a gear (gear exemplified as second lifting shaft 33" in FIG. 5D) connected for rotation with the first lifting shaft 25 (FIG. 5A). In a locked position of the locking arrangement 40, the locking pin 40' is in engagement with the gear on the lifting shaft 25, thereby preventing rotation of the gear (and thus the lifting shaft 25, 26). In an open position of the locking arrangement 40, the locking pin 40' is operated to a position out of engagement with the gear on the lifting shaft 25, thereby the lifting shaft is free to rotate on any instructions from the motor(s) 30.

FIGS. 6A and 6B are perspective views from the sides of the first container handling vehicle with an exemplary lifting assembly according to the invention.

Figure 6D:
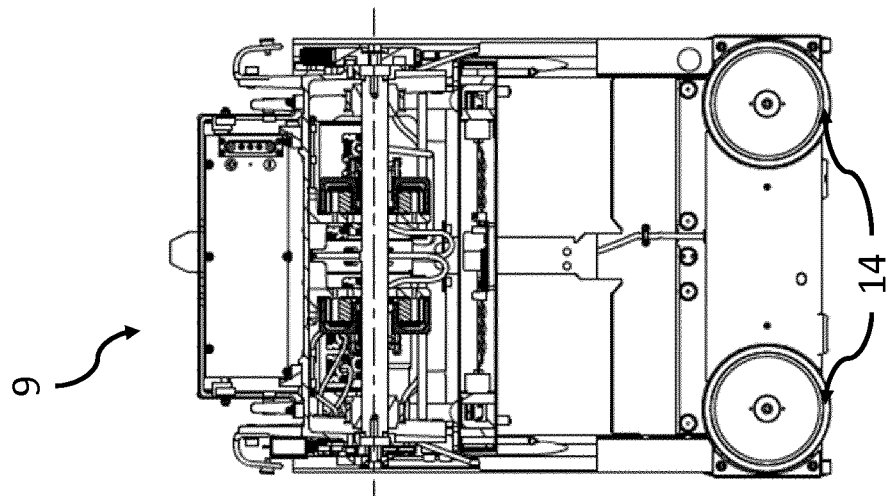
FIGS. 6C and 6D are side views of the first container handling vehicle with an exemplary lifting assembly according to the invention, seen from two different sides.
Figure 6C:
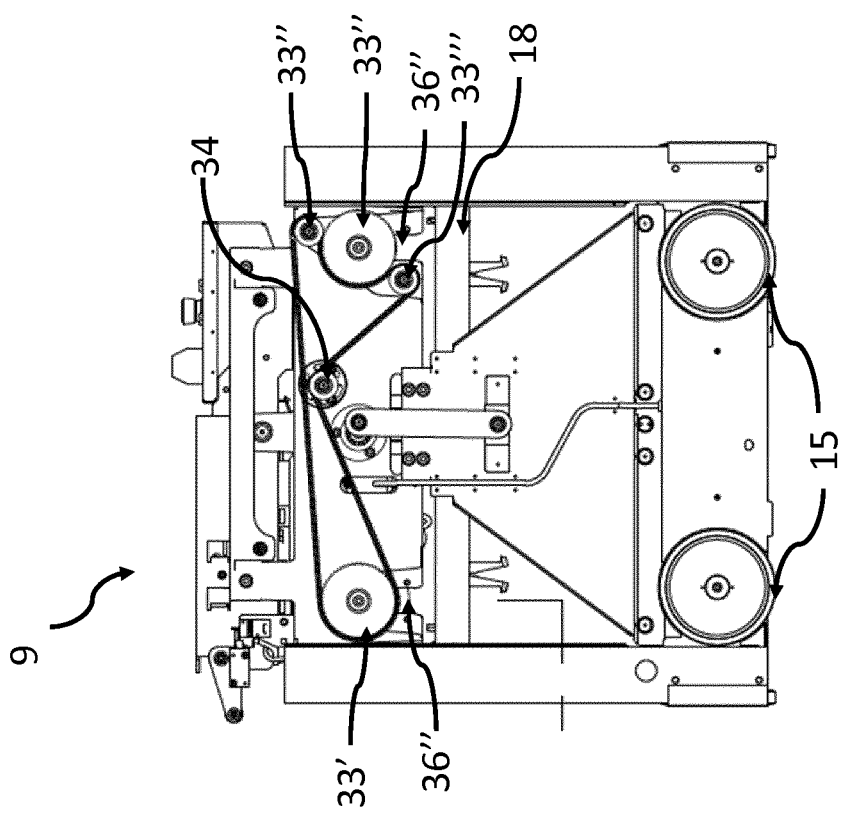

FIGS. 6C and 6D are side views of the first container handling vehicle with an exemplary lifting assembly according to the invention, seen from two different sides.

FIG. 6E is a perspective view of the first container handling vehicle from above, with two motors on the same lifting shaft.

FIG. 6F is a top view of the first container handling vehicle with two motors on the same lifting shaft.

Figure 6G:
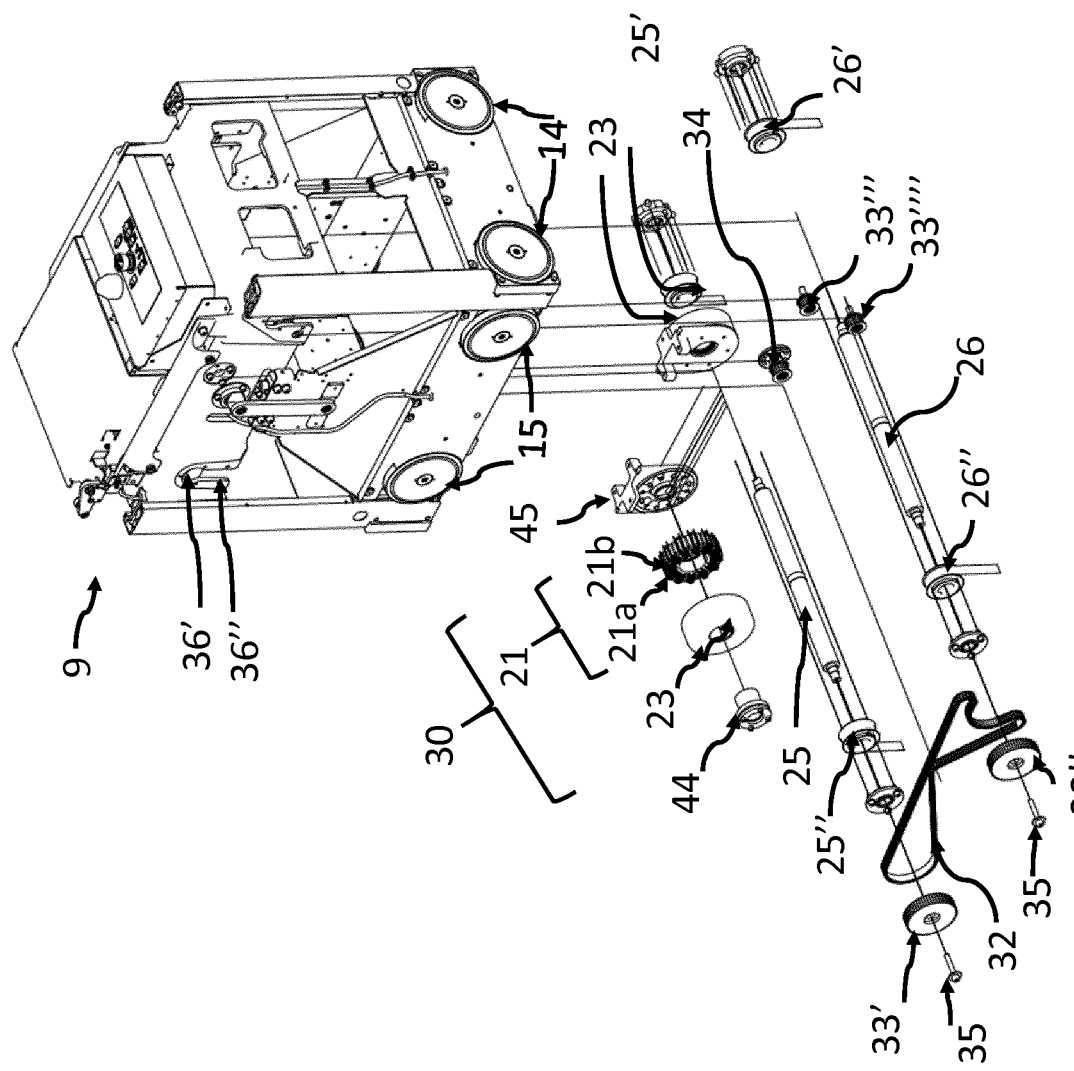
FIG. 6G is a perspective view of the first container handling vehicle with an exploded view of an exemplary lifting assembly according to the invention and with two motors on one of the lifting shafts.

FIG. 6G is a perspective view of the first container handling vehicle with an exploded view of an exemplary lifting assembly according to the invention and with two motors on one of the lifting shafts.

Figure 6H:
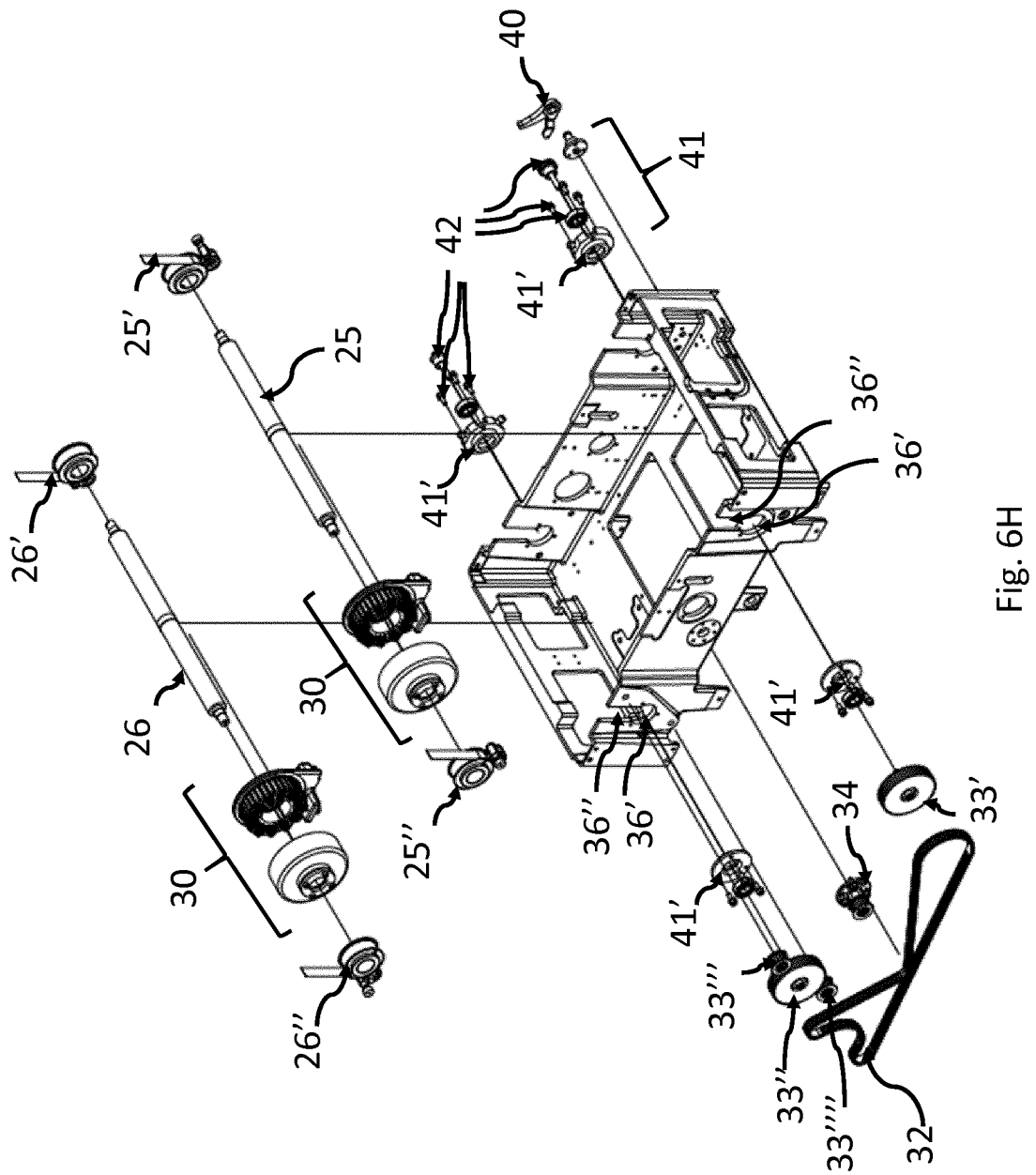
FIG. 6H is an upside down view of a top portion of the container handling vehicle according to the second embodiment.

FIG. 6H is an upside down view of a top portion of the container handling vehicle according to the second embodiment;

Referring to FIGS. 6B and 6H, it is, similar to FIG. 5A, disclosed a brake arrangement 40 for lifting shaft 25. The brake arrangement 40 is arranged outside the housing container handling vehicle 9 and may comprise a locking pin 40' cooperating with a gear connected for rotation with the first lifting shaft 25, e.g. a ratchet mechanism. In a locked position of the locking arrangement 40, the locking pin is in engagement with the gear on the lifting shaft 25, thereby preventing rotation of the gear (and thus the lifting shaft 25). In an open position of the locking arrangement 40, the locking pin is operated to a position out of engagement with the gear on the lifting shaft 25, thereby the lifting shaft is free to rotate on any instructions from the motor(s) 30. Furthermore, in FIG. 6H, details of the support for the lifting shafts 25, 26 and the brushes for power and signal communication to the lifting elements for the first and second lifting shafts 25', 25", 26', 26" arranged in the top portion of the container handling vehicle (generally at 41) are disclosed. Furthermore, FIG. 6H shows details of a 'key-hole'—configuration 36', 36" in the housing of the container handling vehicle for receiving the first and second lifting shafts 25, 26. The key-hole configuration comprises a recess guiding portion 36" with a cross section area substantially equal to the diameter of the first and second lifting shafts 25, 26. As such, the first and second lifting shafts can be guided into an inner recess 36' of a somewhat larger cross section area than the recess guiding portion 36". Once the respective lifting shafts 25, 26 have entered the inner recess 36, supports 41' of substantially equal cross section area as the inner recesses 36' are installed from each axial end of the respective lifting shafts 25, 26, thereby the lifting shafts 25, 26 are locked by suitable fastening means such as threaded connection, screws or bolts 42 in the inner recesses 36' and prevented from escaping the inner recess 36' through the recess guiding portion 36". If any repair or maintenance of the lifting shafts are required, the fastening means 42 are unfastened, the supports 41' removed, and the lifting shafts are free to be removed through the recess guiding portion 36'.

Although the first and second container handling vehicles are different where one has a central cavity construction for receiving storage containers and the other has a cantilever construction for receiving storage containers, the lifting assembly 24 of the first container handling vehicle 9 is the same as the lifting assembly 24 described in relation to the second container handling vehicle 9. Thus, the description of the features and functional operation of the lifting assembly 24 is the same for both container handling vehicles, and will not be repeated.

FIGS. 7A-7F are examples of different setups of force transferring assemblies providing opposite rotation of the first and second lifting shafts 25, 26. As disclosed in all of the examples of FIGS. 7A-7F, common to all of the force transferring assemblies, is the presence of a first and second lifting shaft wheel 33', 33" whereof each is connected for rotation with the respective lifting shaft 25, 26, at least one other guide wheel 33''', 33'''', a force transferring element 32 in the form of an endless belt forming a closed loop and where at least one of the other guide wheels 33''', 33'''' is arranged inside the closed loop. In addition, the first or second lifting shaft wheel 33', 33" is in contact with an inner surface of the endless belt 32 and the other of the first or second lifting shaft wheel 33', 33" is in contact with the outer surface of the endless belt 32. This is achieved by arranging one of the first or second lifting shaft wheels 33', 33" inside the closed loop formed by the force transferring element 32 and the other of the first or second lifting shaft wheel 33', 33" outside the closed loop formed by the force transferring element 32. The mutual setup of the first and second lifting shaft wheels 33', 33", the guide wheels 33''', 33'''' and the force transferring element 32, are such that the first and second lifting shafts 25, 26 (via first and second lifting shaft wheels 33', 33", respectively) rotate in opposite directions (counter rotates). The first and second lifting shaft wheels 33', 33" are preferably arranged in the same horizontal plane in order to ensure horizontal stability during lifting. The guide wheel(s) 33''', 33'''' are arranged along the travel of the force transferring element 32 at fixed positions such that they provide for a "change" in the travel direction of the force transferring element 32. Each of the guide wheels 33''', 33'''' are arranged to lead the force transferring element 32 correctly onto the first and second lifting shaft wheel 33', 33" thereby allowing the first and second lifting shaft wheels 33', 33" (and thus the lifting shafts 25, 26) to rotate in opposite directions.

In the example in FIG. 7A, one guide wheel 33''' is shown.

In the examples of FIGS. 7B-7F, a number of examples of force transferring assemblies comprising two guide wheels 33''', 33'''', are shown. The guide wheels 33', 33" are arranged alternating along the path of the force transferring element 32 such that the first lifting shaft wheel 31' is followed by a guide wheel 33''', 33'''' and the second lifting shaft wheel 33" is followed by a guide wheel 33''', 33'''' in both directions of travel of the force transferring element 32.

In the examples of FIGS. 7D, 7E, 7F, there are disclosed examples comprising a tightening wheel 34 for tensioning of the force transferring element 32. The tightening wheel 34 may for example be an eccentric tensioning mechanism comprising a rotatable guide wheel with an axle that can be adjusted within an opening in a fixed bracket. The location of the tightening wheel 34 along the path of the force transferring element 32 is preferably at a location where the path length of the force transferring element 32 can be affected (i.e. the path of the force transferring element can be shortened or prolonged in order to further tension or reduce tension in the force transferring element). The tightening wheel 34 can be arranged inside (FIGS. 7D and 7F) or outside (FIG. 7E) the closed loop formed by the force transferring element 32.

In the examples in FIGS. 7A-7C, a dedicated tensioning mechanism such as a tightening wheel is not shown; however, if a tensioning mechanism is required, one of the guide wheels 33''' or 33'''' may be a tensioning mechanism and can be replaced by a tightening wheel 34.

One or more of the aspects of the invention provides for advantages over prior art, including:
- The efficiency of the lift of storage containers between the container handling vehicle and the storage columns is improved,
- The capacity of the storage system in terms of moving more storage containers in less time is increased,
- The system compensates if a load of a storage container is unequally distributed and the center of gravity of the storage container is more to one side than another side,
- The lifting system is easier to assemble and maintain, and comprises fewer parts than the prior art solutions.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

LIST OF REFERENCES

| | |
|---|---|
| 1 | Framework structure |
| 2 | Upright member |
| 3 | Horizontal member |
| 4 | Storage grid |
| 5 | Storage column |
| 6 | Storage container |
| 7 | Stack |
| 8 | Rail system |
| 9 | Container handling vehicle |
| 10 | First set of rails |

-continued

| | |
|---|---|
| 11 | Second set of rails |
| 12 | Grid column |
| 13 | Vehicle body |
| 14 | First set of wheels (transport mechanism) |
| 15 | Second set of wheels (transport mechanism) |
| 16 | Lifting device (elevator) |
| 17 | Connection |
| 18 | Lifting frame |
| 19 | First port column |
| 20 | Second port column |
| 21 | stator |
| 21a | Windings |
| 21b | yokes |
| 23 | cover |
| 24 | Lifting assembly |
| 25 | First Lifting shaft |
| 25', 25" | Lifting elements first lifting shaft |
| 26 | Second Lifting shaft |
| 26', 26" | Lifting elements second lifting shaft |
| 30 | Motor |
| 32 | force transferring element, belt |
| 33' | First lifting shaft wheel |
| 33" | Second lifting shaft wheel |
| 33''', 33'''' | Guide wheel |
| 34 | Tightening wheel |
| 35 | Fastening element |
| 36' | Inner recess |
| 36" | Recess Guiding portion |
| 37 | Flexible element connections for lifting elements |
| 38 | gripper |
| 39 | Guiding device |
| 40 | Brake arrangement |
| 41' | support |
| 44 | Cone bearing |
| 45 | Stator housing |
| 46 | Wheel rim |

The invention claimed is:

1. An automated storage and retrieval system comprising:
a rail system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
a plurality of stacks of storage containers arranged in storage columns located beneath the rail system, wherein each storage column is located vertically below a grid opening; and
a container handling vehicle comprising:
a transport mechanism for transport of the vehicle on the rail system, and
a lifting assembly for picking up storage containers from the storage columns to a position above the lowest level of the transport mechanism,
wherein the lifting assembly comprises:
a lifting frame connectable to a storage container,
a first lifting shaft and a second lifting shaft, the first and second lifting shafts being mainly parallel, and each of the first and second lifting shafts being supported in an upper portion of the vehicle,
two lifting elements extending from each of the first and second lifting shafts to the lifting frame,
a motor drive assembly comprising at least a first motor, wherein the at least first motor encircles one of the lifting shafts, and
a force transferring assembly, which comprises two or more lifting shaft wheels and at least one guide wheel, rotatably connecting the first and second lifting shafts via a force transferring element.

2. The automated storage and retrieval system according to claim 1, wherein the force transferring element comprises an endless belt with an inner surface and an outer surface and wherein the first lifting shaft is in contact with the inner surface or the outer surface of the belt and the second lifting shaft is in contact with the other of said inner surface or outer surface of the belt.

3. The automated storage and retrieval system according to claim 2, wherein the force transferring assembly comprises a first lifting shaft wheel connected for rotation with the first lifting shaft and a second lifting shaft wheel connected for rotation with the second lifting shaft and the at least one guide wheel urging the outer surface of the belt against one of the first or second lifting shaft wheels, such that when one of the first or second lifting shaft moves in a first rotational direction the other of said first and second lifting shaft moves in a second rotational direction opposite the first direction, in both rotational directions.

4. The automated storage and retrieval system according to claim 3, wherein the endless belt forms a closed loop and wherein one of the first or second lifting shaft wheels is arranged inside the closed loop and the other of the first or second lifting shaft wheels is arranged outside the closed loop.

5. The automated storage and retrieval system according to claim 1, wherein the force transferring assembly comprises a tensioning mechanism for initial tightening of the force transferring element.

6. The automated storage and retrieval system according to claim 1, wherein the at least one motor comprises a brushless DC motor.

7. The automated storage and retrieval system according to claim 6, wherein the at least first motor comprises a rotary electrical motor converting direct current electrical energy into rotational energy of the at least first or second lifting shafts.

8. The automated storage and retrieval system according to claim 1, wherein the motor drive assembly comprises a second motor and wherein the second motor encircles the same lifting shaft as the first motor, and wherein the force transferring assembly comprises a belt transferring torque from the first or second lifting shaft with the first and second motors to the other of the first or second lifting shaft.

9. The automated storage and retrieval system according to claim 1, wherein the motor drive assembly comprises a second motor encircling the other of said first or second lifting shaft different from the first motor, and wherein the force transferring assembly comprises a timing belt providing synchronous movement of the first and second lifting shafts relative each other.

10. The automated storage and retrieval system according to claim 1, wherein a rotational force of the motor drive assembly corresponds to intended maximum weight of storage container with item.

11. The automated storage and retrieval system according to claim 1, wherein the force transferring assembly comprises a number of angular gears and a link shaft, wherein the angular gears are connected for rotation with each of the first and second lifting shafts and the link shaft is arranged between the angular gears of the first and second lifting gears.

12. A method of operating an automated storage and retrieval system according to claim 1, comprising providing signals to different container handling vehicles operating in said system to store storage containers in stacks and retrieve storage containers from stacks.

13. A container handling vehicle for moving storage containers stacked in stacks within an automated storage and retrieval system, wherein the container handling vehicle is configured to move on a rail system above storage columns and comprises:
- a lifting assembly for picking up storage containers from the storage columns to a position above the lowest level of the transport mechanism on the container handling vehicle, wherein the lifting assembly comprises:
- a lifting frame connectable to a storage container,
- a first lifting shaft and a second lifting shaft, the first and second lifting shafts being mainly parallel, each of the first and second lifting shafts being supported in an upper portion of the vehicle,
- two lifting elements extending from each of the first and second lifting shafts to the lifting frame,
- a motor drive assembly comprising at least a first motor, wherein the at least first motor encircles one of the lifting shafts, and
- a force transferring assembly, which comprises two or more lifting shaft wheels and at least one guide wheel, rotatably connecting the first and second lifting shafts via a force transferring element.

14. A container handling vehicle according to claim 13, wherein the force transferring element comprises an endless belt with an inner surface and an outer surface and wherein the first lifting shaft is in contact with the inner surface or the outer surface of the belt and the second lifting shaft is in contact with the other of said inner surface or outer surface of the belt and a first lifting shaft wheel connected for rotation with the first lifting shaft and a second lifting shaft wheel connected for rotation with the second lifting shaft and the at least one guide wheel, such that when one of the first or second lifting shaft moves in a first rotational direction the other of said first and second lifting shaft moves in a second rotational direction opposite the first direction, and wherein the endless belt forms a closed loop and wherein one of the first or second lifting shaft wheels is arranged inside the closed loop and the other of the first or second lifting shaft wheels is arranged outside the closed loop.

15. Use of a container handling vehicle according to claim 13 for storage and retrieval of storage containers in a storage system.

16. A method of operating a lifting assembly of a container handling vehicle comprising:
- arranging a motor drive assembly comprising at least a first motor to encircle a first or a second lifting shaft of the lifting system,
- connecting two lifting elements from each of the first and second lifting shafts to a lifting frame,
- rotationally coupling the first and second lifting shafts, through a force transferring assembly comprising two or more lifting shaft wheels and at least one guide wheel, to synchronize the raising and lowering of opposite sides of the lifting frame, and
- using a lifting assembly for picking up storage containers from storage columns to a position above the lowest level of the transport mechanism on the container handling vehicle.

17. A method according to claim 16, further comprising:
encircling a second motor around the same first or second lifting shaft as the first motor, or around the other of said first or second lifting shaft as the first motor.

* * * * *